United States Patent [19]

Brown et al.

[11] 3,778,044

[45] Dec. 11, 1973

[54] METHOD AND APPARATUS FOR RECOVERY AND REFINING OF ZINC

[76] Inventors: Clayton R. Brown, 233 S. Hacienda Dr., Arcadia; Milton Templer, 8013 San Lucas Dr., Whittier, both of Calif.

[22] Filed: July 13, 1971

[21] Appl. No.: 162,130

[52] U.S. Cl. .................................... 266/19, 75/88
[51] Int. Cl. ........................................ C22b 19/14
[58] Field of Search .................. 75/63, 88; 266/19, 266/15

[56] References Cited
UNITED STATES PATENTS

| | | | |
|---|---|---|---|
| 902,535 | 10/1908 | Johnson | 75/88 |
| 1,712,133 | 5/1929 | Breyer | 75/88 |
| 1,994,349 | 3/1935 | Ginder et al. | 75/88 |
| 1,994,356 | 3/1935 | Pierce et al. | 266/19 |
| 2,331,988 | 10/1943 | Loevenstein | 75/63 |
| 2,670,196 | 2/1954 | Breyer et al. | 266/19 |
| 3,045,995 | 7/1962 | Handwerk | 266/19 |

*Primary Examiner*—Gerald A. Dost
*Attorney*—Whann & McManigal

[57] ABSTRACT

A method and apparatus for recovering and refining zinc from scrap metals having a high zinc content. The scrap metals are melted in a conventional furnace and introduced in a molten state into the distillation zone of the apparatus of the invention. The apparatus comprises an atmospherically sealed vertical column having a distillation zone and a communicating superposed fractionation zone. Arranged within the vertical column is a plurality of vertically spaced horizontally staggered trays constructed of a suitable refractory material. Molten material is continuously introduced into the apparatus through a metal seal and flows downwardly in a circuitous path over the trays disposed in the distillation zone. The metal in each tray is heated to temperatures sufficient to vaporize zinc by means of precisely controllable radiant heating elements located immediately above and below each tray. The zinc vapors rise through the distilling zone in countercurrent with the descending molten metal, pass through the factionating column where various impurities are removed, and then are directed into a condenser wherein they are condensed to metallic zinc of high purity.

1 Claim, 5 Drawing Figures

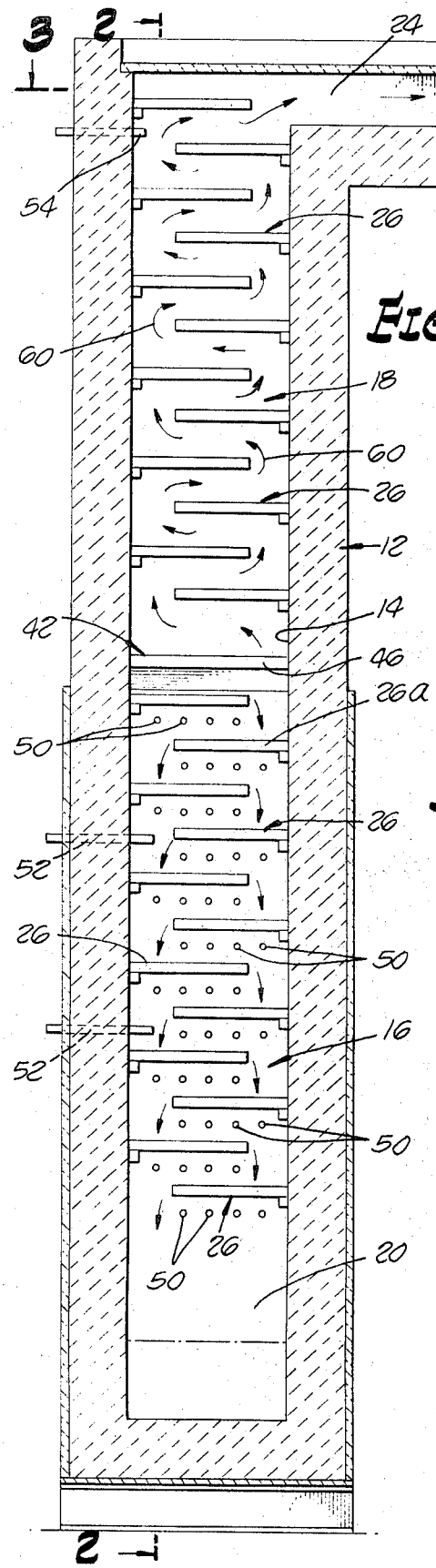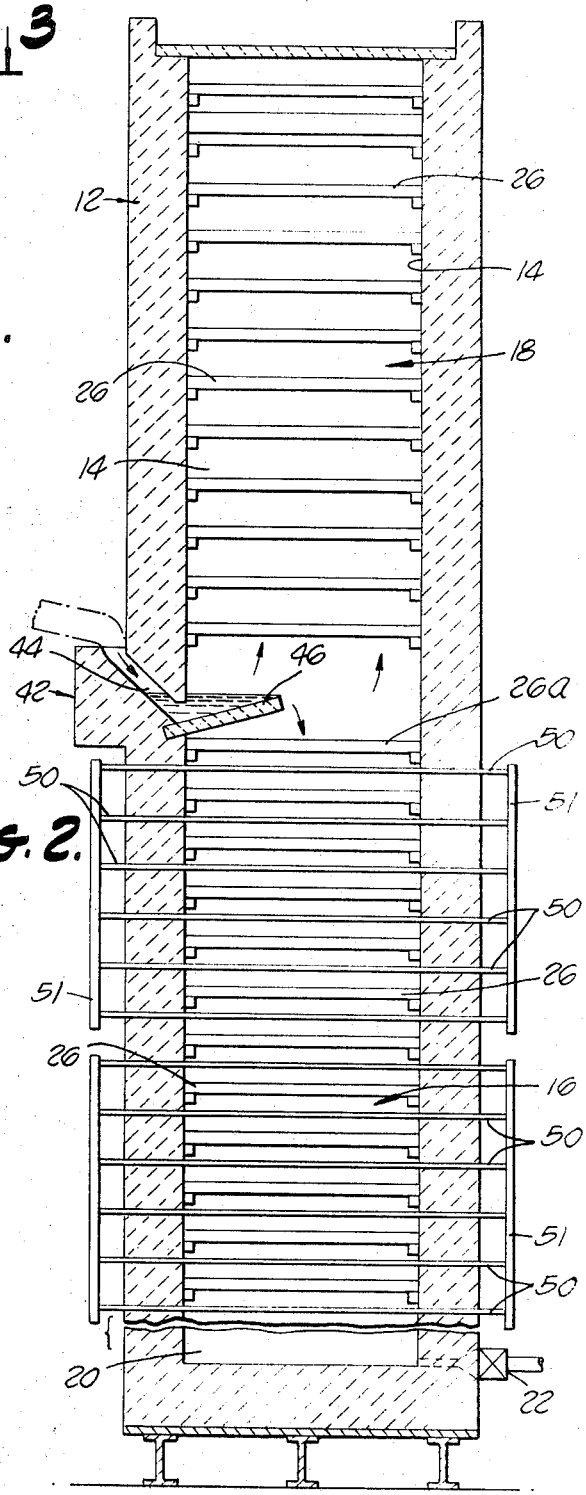

INVENTORS.
CLAYTON R. BROWN
MILTON TEMPLER
BY WHANN & McMANIGAL
Attorneys for Applicants

3,778,044

METHOD AND APPARATUS FOR RECOVERY AND REFINING OF ZINC

BACKGROUND OF THE INVENTION

1. Field of the Invention

This invention relates generally to methods and apparatus for refining zinc and more particularly to a method and apparatus for recovering and refining zinc from zinc-bearing scrap materials.

2. Description of the Prior Art

The rapid depletion of the earth's natural zinc resources makes mandatory the development of economical, efficient, and ecologically acceptable methods for recovering zinc from zinc-bearing scrap materials.

Zinc-rich materials are in relative abundance since numerous types of short useful life articles manufactured in large volume contain zinc in commercially recoverable quantities. The largest source of such material is in the form of discarded zinc die-cast articles. Such articles include automobile carburetors and fuel pumps, certain types of household applicance and office equipments, and aircraft forming dies. Unfortunately, because of low efficiencies, high cost and atmospheric pollution problems inherent in presently known zinc recovery processes, much zinc-rich scrap is being lost to land fill dumps rather than being collected for recovery because of the low price being paid for such scrap.

Of the numerous methods for recovering and refining zinc which are disclosed in the prior art, the oldest and most common method is the batch-type retort method which typically uses horizontal retorts for melting the scrap materials. In practicing this method retorts, typically constructed or graphite, silicon carbide or other refractory materials, are charged with the zinc-bearing material and are placed in a furnace wherein the material is melted by conduction heating. When sufficiently high temperatures are reached in the retort the zinc in the scrap will vaporize and the zinc vapors will ascend into a space provided within the retort above the molten metal. The zinc vapors are continuously evacuated from the retort and are diverted into a condenser wherein they are condensed to zinc metal or zinc dust, depending on the type of condenser used.

Batch-type methods using horizontal retorts or muffle furnaces are quite inefficient and present numerous processing difficulties. In a small retort such as is commonly used in the prior art, the percentage of wall surface in contact with the liquid material is very limited and because heating is by conduction through the walls of the retort, the efficiency of vaporization of the zinc is extremely low. If the size of the retort is increased, numerous structural difficulties are encountered because of the very large hydrostatic pressures exerted by the heavy molten material. Additional problems encountered in typical retort-type processes are attributable to the fact that the bath of molten metal within the retort is of necessity quite deep. Carrying out vaporization in a deep bath of molten metal results in increased boiling points at the bottom of the retort, and also results in violent ebullition, which is objectionable because it contaminates the vapor above the liquid with a spray of impure metal. Retorts will quite often break while in operation. This results in the molten zinc material flowing into the combustion zone of the furnace and voluminous quantities of zinc oxide are then either released to the atmosphere or must be collected by very costly air pollution equipment.

In methods such as the muffle furnaces all the heat for distillation is obtained by radiation from above the bath which is relatively deep, and irregular vaporization at the end of the cycle is experienced. Very low fuel efficiencies are characteristic of this method.

Keeping an atmospheric seal between the combustion zone and the distillation zone of the furance prevents problems because the seal is usually made of relatively small tiles of silicon carbide with the resultant numerous joints between the tiles, any of which may open. Leaks or breakage of the seal result in: (1) evolution of zinc oxide with the same problems as related above in the description of retorts; and (2) oxidation of zinc vapors which can affect the quality of zinc dust or result in lower recoveries of zinc if zinc is being produced.

Applicant is familiar with the following U.S. Pat.: Holstein, et al. Nos. 1,994,345, 1,994,346 and 1,994,358; Ginder Nos. 1,994,347 and 1,994,348; Ginder, et al. Nos. 1,980,480, 1,994,349, 1,994,350, 1,994,351, 1,994,352, 1,994,353, 1,994,354 and 1,994,357; Peirce, et al. Nos. 1,994,355 and 1,994,356; Langhorne No. 2,267,698, Poland No. 2,463,468; Robson No. 2,473,304; and Lundevall No. 2,939,783.

Some of the drawbacks of the batch-type retort or muffle furnace method are overcome by processes of the type illustrated by U.S. Letters Pat. No. 2,939,783 issued to Lundevall. This patent relates to a process and apparatus for refining impure zinc from old die-cast alloys and, unlike most retort processes, is substantially continuous employing a horizontal furnace having a plurality of chambers interconnected by various passageways through which molten metals and vapors may circulate. Processes of this type, since they are continuous, are superior to prior art retort or muffle furnace batch-type processes.

Another type of continuous process involving volatilizing of zinc metal is illustrated in U.S. Letters Pat. No. 1,994,355 and No. 1,994,356 to Peirce, et al. The invention disclosed in these patents relates to a method and apparatus for volatilizing relatively pure zinc metal in a substantially continuous operation. The apparatus of Pierce, et al. is vertically rather than horizontally disposed and comprises a chamber having a plurality of spaced trays adapted to hold pools of molten metal, each having an opening to permit downward flow of molten metal and upward flow of vapor.

The Peirce, et al., apparatus and method differ from that of our invention in several significant aspects. A major advantage of our invention over Peirce lies in the fact that in our invention the heating and volatilizing of the zinc-rich metal are accomplished in a highly efficient manner by radiation of heat from radiation elements located in close proximity with the trays containing the molten metal. In the Peirce apparatus the heating is accomplished by a heating source outside the volatilizing chamber and comprising a massive furnace having a large heating chamber which completely surrounds the volatilizing chamber. Another significant advantage of our invention relates to the fact that because of the unique design of the apparatus we can advantageously provide a plurality of precisely controllable temperature zones within the volatilizing chamber, thereby markedly increasing the efficiency and productivity of the apparatus. Additionally, of great importance is the fact that the apparatus of our invention, being atmospherically sealed, in no way contributes to atmospheric pollution and, therefore, requires no costly ancillary air pollution control equipment.

SUMMARY OF THE INVENTION

The previously mentioned and other disadvantages of the prior art methods and apparatus for recovering and refining of zinc from scrap metals make extremely desirable, from an overall ecology standpoint, the provision of a method and apparatus whereby such disadvantages may be avoided or overcome. It is an important object of our invention, therefore, to provide a method and apparatus for the continuous recovery of zinc from scrap metals in which the apparatus is atmospherically sealed and economical to construct, and in which the method will produce high purity zinc from scrap metals with greater efficiencies than heretofore possible.

It is a further object of our invention to privide an apparatus for the recovering and refining of zinc from scrap metals in which the process may be carried out in a single vertical chamber housing both a distillation zone and a fractionation zone.

It is another object of our invention to provide an apparatus as described in the preceding paragraph in which various precisely controllable temperature zones are provided within the distillation zone so as to enable the maximum recovery of zinc from the scrap materials.

It is a further object of our invention to provide an apparatus as described in which the zinc-bearing metal is contained in a plurality of vertically spaced shallow trays and is heated to zinc volatilization temperatures by means of radiant heaters positioned both above and below the trays in the distillation zone and in close proximity therewith so as to efficiently volatilize the zinc.

It is another object of our invention to provide a method and apparatus of the type described in which the construction of the trays for containing the molten metal and the arrangement of the radiant heaters with respect thereto are such that irregular boiling and superheating of the molten metal are precluded.

It is another object of our invention to provide a method and apparatus as described in the previous paragraphs in which the molten zinc-bearing metal is caused to continuously cascade downwardly from tray to tray so as to encourage the release of zinc vapor from the molten metal, and in which the trays are constructed so as to encourage a circuitous flow of the metal through the trays so as to maintain impurities in liquid suspension.

It is still another object of our invention to provide an apparatus as previously described in which the zinc vapors, as they rise in the vertical chamber, continuously encounter and mingle with the descending molten metal.

In summary, our invention comprises a method and apparatus for volatilizing zinc metal in which molten metal containing zinc is passed downwardly through an upright chamber having a distillation zone and a superposed fractionation zone. A plurality of vertically spaced horizontally staggered trays adapted to contain shallow pools of molten metal is positioned with the chamber. The molten metal in the trays within the distillation zone is heated to temperatures sufficient to volatilize zinc by simultaneously radiantly heating the upper surface of the metal and the lower surface of the tray by means of radiant heating elements positioned between the trays. The trays are positioned so as to permit the molten metal to cascade downwardly over the trays in a circuitous path and so as to permit the zinc vapor to rise to the top of the chamber where it is conducted to a condenser unit.

BRIEF DESCRIPTION OF THE DRAWINGS

FIG. 1 is a sectional elevation of an apparatus for recovering and refining zinc from scrap metal in accordance with the method of our invention.

FIG. 2 is a sectional view taken along line 2—2 of FIG. 1 illustrating the construction of the metal seal for introducing the molten metal into the apparatus and also illustrating the arrangement of the radiant heating elements in the distillation zone.

DESCRIPTION OF THE PREFERRED EMBODIMENT

Figure 4:
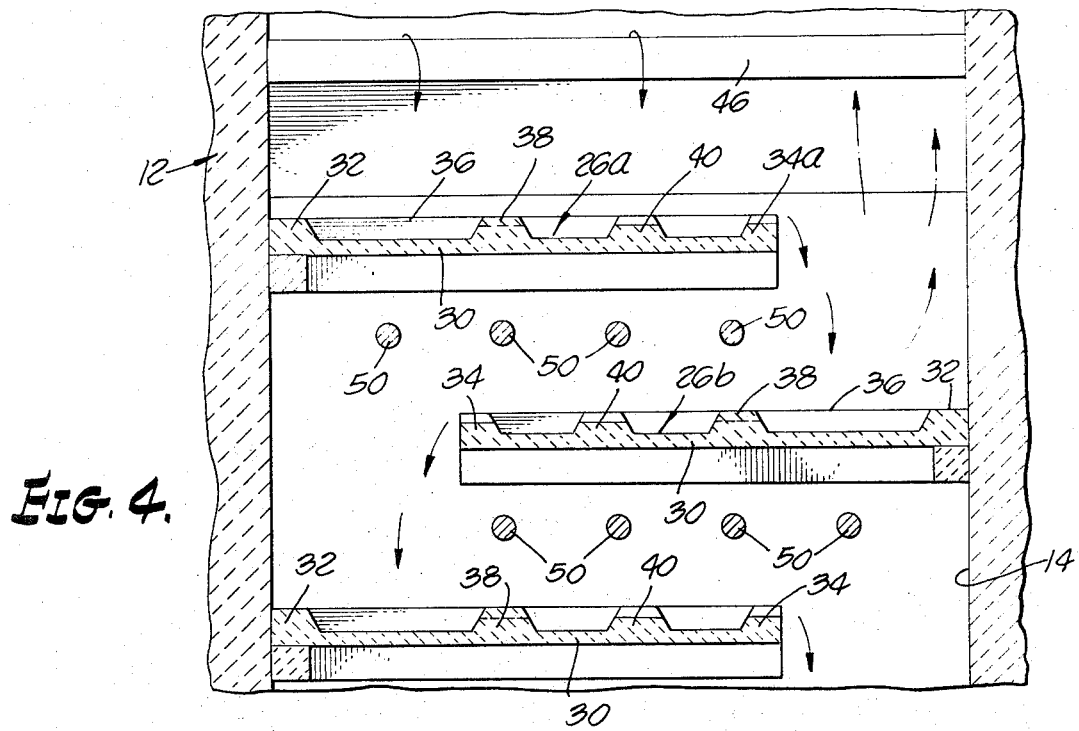
FIG. 4 is a fragmentary sectional view showing the relative positioning of the metal containing trays and the radiant heating elements, and illustrating the flow path of the molten metal from tray to tray.

Referring to FIG. 1 and FIG. 2 of the drawings, there is shown an upright atmospherically sealed structure 12 having an internal chamber 14 in which the scrap material is processed. Chamber 14 is divided into a lower distillation zone 16 and a communicating upper fractionation zone 18. At the bottom of chamber 14 is a residue catch basin 20 and a residue tapping means shown as orifice or tap hole 22 through which residue may be periodically withdrawn from the apparatus. At its top chamber 14 is provided with an outlet 24 for withdrawing zinc vapor evolved therein. The outlet 24 is operatively connected with a condenser (not shown) for condensing the zinc vapor. Depending upon the type of condenser used, zinc metal or zinc dust may be produced or the vapors may be oxidized to form zinc oxide.

Figure 5:
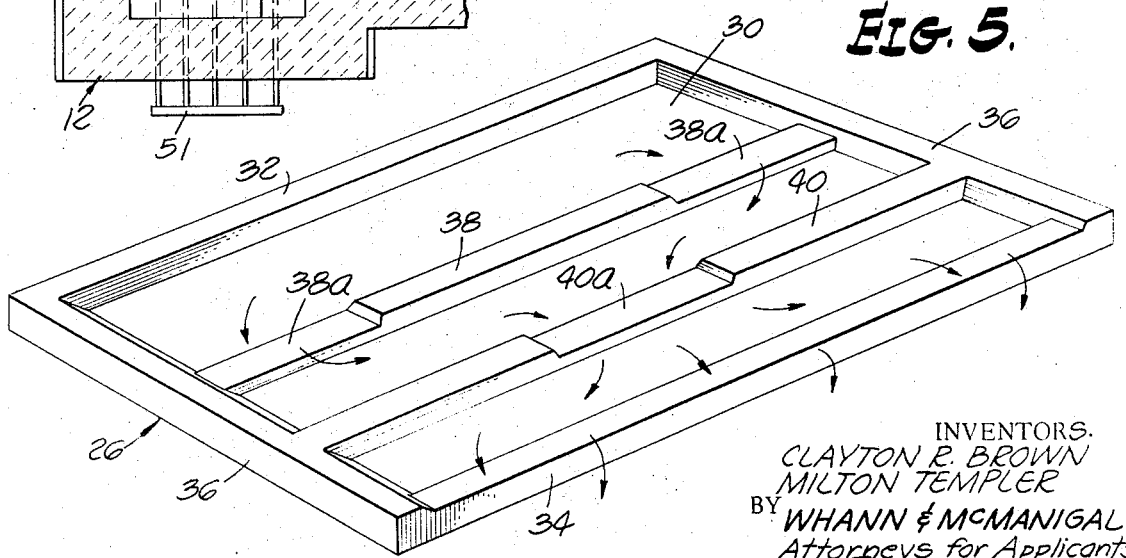
FIG. 5 is a perspective view of one of the metal containing trays illustrating the details of its construction.

Located within chamber 14 above basin 20 is means for containing molten metal in the form of a plurality of vertically spaced trays 66 which are constructed of graphite, silicon carbide or other suitable refractory material. These trays are positioned in a horizontally staggered relationship and, as shown in FIGS. 4 and 5, have a base 30, an outer wall 32, an inner wall 34, and a pair of side walls 36. The walls are beveled inwardly and, with the base, serve to retain shallow pools of molten metal. Inner wall 34 has a lesser wall thickness than the side and outer walls as do ribs 38 and 40 which extend transversely of the trays. The unique design and arrangement of the walls and connecting ribs of trays provide means for encouraging the molten metal to follow a circuitous path as it circulates through the trays prior to cascading to the tray immediately below. In this way impurities wihtin the molten metal are kept in liquid suspension. As can best be seen in FIG. 5, ribs 38 and 40 have sections 38a and 40a which are further reduced in wall thickness and which are located in a staggered relationship to one another so as to encourage the circulation of molten metal within the tray along paths indicated by the arrows in FIG. 5. The trays are attached to structure 12 at their outer walls 32 and, as shown in FIGS. 1 and 4, cantilever into chamber 14.

Near the top of distillation zone 16 there is provided a charging means 42 for accommodating the introduction into the apparatus of molten zinc-rich scrap material from a conventional melting furnace (not shown). Charging means 42, as can best be seen in FIG. 2, is in the form of a metal seal arrangement in which a downwardly inclined passageway 44 through an outer wall of structure 14 provides means whereby molten metal can be introduced into the apparatus. Passageway 44 is positioned to communicate with means for maintaining a pool of liquid metal within the chamber shown in the form of an upwardly inclined member 46 disposed internally of chamber 14. As metal is poured into the apparatus, the pool of molten metal formed between the chamber walls and member 46 seals passageway 44 from atmosphere so that vapors from chamber 14 cannot escape.

Figure 3:
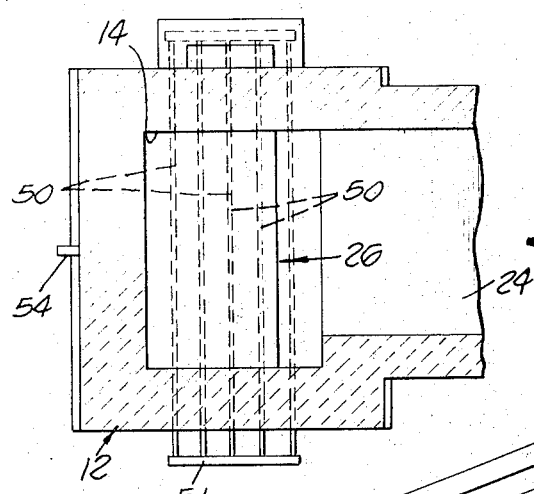
FIG. 3 is a plan view taken along line 3—3 of FIG. 1.

Referring particularly to FIGS. 2, 3 and 4, means for heating the metal contained within the trays located in distillation chamber 16 are provided in the form of radiant heating elements 50 which are positioned immediately above and below each tray. Heating elements 50 are constructed of a suitable refractory material such as silicon carbide or graphite and, in the preferred form of our invention, heating is accomplished electrically by using electrical resistance rods such as graphite resistor rods. If desired, however, the heating elements may be made of tubular construction and be adapted for internal burning of combustible fuels such as oil or gas.

Heating elements 50 extend across and sealably through structure 12, as indicated in FIG. 2, and have their ends connected to common manifolds or electrical power lines 51. For purposes of illustration, we show two banks of heating elements which are adapted to be separately controlled. It is to be appreciated that any number of separately controlled banks of heating elements greater than one can be used so as to provide a plurality of different controllable temperature zones within distillation chamber 16.

Means for measuring the temperatures at different locations within the distillation zone are provided in the form of pyrometers 52 which extend through the walls of the processing structure into the distillation zone. These pyrometers may be connected with controls (not shown) for automatically regulating the energy output of the banks of heating elements within the distillation zone in a manner well known in the prior art.

OPERATION

In practicing the method of our invention, zinc-bearing scrap metal is first placed into a conventional furnace located in the proximity of the structure 12 where it is melted. The temperature of the molten scrap is maintained at temperatures on the order of 1,000° F. or greater so that it may be transferred in liquid form into structure 12 through charging means 42. As illustrated in FIG. 4, the molten metal will flow over metal seal member 46 and fall into tray 26a. The metal will circulate through the tray as shown by the arrows in FIG. 5, and will then flow over inner wall 34a onto tray 26b, which is the first tray in the distillation zone. The circulation patterns of the molten metal within the trays, which result from the unique design of the circulation means within the trays, serve to keep residue materials in solution and prevent residue buildup on the trays. As molten metal is added to the apparatus either continuously or at frequent intervals, the molten metal in the trays will continue to circulate and overflow so as to cascade downwardly in a circuitous path from tray to tray.

Important features of our invention include the unique design of the metal containing trays and the radiant heating of the metal contained therein by means of radiant heating elements strategically placed immediately above and below each tray in the distillation zone. Because of the shallowness of the trays and relatively large surface area of the molten metal which is exposed to heat both at its upper surface from the upper heater and at its lower surface from the bottom of the tray which is efficiently heated by the lower heater, superheating is avoided and uniform and extremely efficient volatilization of the zinc takes place. In practicing our invention, molten metal is added to the apparatus at a rate so as to maintain shallow pools of molten metal in each tray, and so that a small amount of metal continuously flows into catch basin 20. Impurities less volatile than zinc such as high-aluminum content residues are periodically removed from the apparatus through tap hole 22.

Another important feature of our invention relates to the novel and unique means provided for maintaining precisely controllable temperature zones within the apparatus. By controlling the energy radiated from the heating elements in the manner previously described, temperature zones within the distillation zone can be precisely maintained and controlled so as to maximize the vaporization of the zinc as the molten metal flows downwardly through the apparatus, thereby maximizing the percentage of zinc which can be recovered from the scrap.

As the metal cascades from tray to tray, zinc is constantly vaporizing. Because of the constant breaking of the surface of the molten metal, the vapors are relased more readily than n a static bath and in is effectively precluded.

As the zinc vapors rise through the distillation zone, they tend to be purified through a washing action resulting from their comingling with the descending molten metal. As the vapors rise above the distillation zone they pass directly into the fractionation zone as indicated by the arrows 60, wherein lead, iron, tin, and aluminum are removed in a manner which is well known in the art and, consequently, will not be described in detail herein. If removal of cadmium is desired, the zinc vapors can be passed through a separate column wherein cadmium may also be removed in a well known manner.

Within the fractionation zone which accepts the constant flow of zinc vapors from the distillation zone, we position trays constructed and arranged in a manner identical to those in the distillation zone. As a result of reflux action within the fractionation zone, molten metal will of course move downwardly from tray to tray and will pass into the distillation zone for reheating and vaporization. If desired, removable insualting walls or insulating curtains (not shown) can be provided within the fractionation column to control the reflux action in a manner well known in the prior art.

Referring to FIG. 1, we provide at the upper end of fractionation zone 18 a sensing means 54, which may be in the form of a pressure-sensing device, for sensing the pressure of zinc vapors within the apparatus. Sensing means 54 is connected to control instrumentation (not shown) which is adapted to override the controls which regulate the heating elements within the distillation zone should the rate of distillation become too great for the condenser to properly function.

The zinc vapors reaching the top of the fractionation zone pass through passageway 24 into the condenser for condensation to form metallic zinc or zinc dust. If metallic zinc is produced, it can be fed directly into an alloying furnace for conversion into die-cast alloy.

We claim:

1. An apparatus for recovering zinc metal from zinc containing scrap metal comprising:
   a. a single atmospherically sealed upright chamber having a distillation zone and a communicating superposed fractionation zone;
   b. a plurality of trays disposed within said chamber in a vertically-spaced, horizontally staggered relationship, said trays being adapted to contain a shallow pool of liquid metal and comprising a base, an inner wall and outer wall, side walls interconnecting said inner and outer walls, and a plurality of transversely extending ribs having spaced sections of decreased wall thickness, said trays being arranged so as to allow an upward flow of vapor through said upright chamber and a downward cascading of liquid metal from tray to tray through said upright chamber;
   c. heat radiating means located above and below trays within said distillation zone for radiating heat to the top surface of the tray below said heat radiating means and to the bottom of the tray above said heat radiating means, said radiating means being located out of the path of downward flow of liquid metal through said upright chamber, and comprising a plurality of spaced heat radiating elements extending transversely of said upright chamber, said heat radiating elements being interconnected into a plurality of banks of heat radiating elements adapted to be controlled by said control means;
   d. control means for controlling said heat radiating means so that a plurality of temperature zones may be established and maintained within said distillation zone;
   e. metal seal means for introducing liquid scrap metal into said upright chamber without exposing said chamber to atmosphere; and
   f. means for sensing metal vapor content within said fractionation zone and for overriding said control means when the metal vapor content exceeds a predetermined level.

* * * * *